US007342625B2

United States Patent
Jeoung et al.

(10) Patent No.: US 7,342,625 B2
(45) Date of Patent: Mar. 11, 2008

(54) LIQUID CRYSTAL DISPLAY DEVICE AND METHOD FOR FABRICATING THE SAME

(75) Inventors: Hun Jeoung, Gyeongsangbuk-do (KR); Seung Jun Moon, Gyeongsangbuk-do (KR)

(73) Assignee: LG.Philips LCD Co., Ltd., Seoul (KR)

( * ) Notice: Subject to any disclaimer, the term of this patent is extended or adjusted under 35 U.S.C. 154(b) by 308 days.

(21) Appl. No.: 11/016,894

(22) Filed: Dec. 21, 2004

(65) Prior Publication Data

US 2005/0140875 A1 Jun. 30, 2005

(30) Foreign Application Priority Data

Dec. 30, 2003 (KR) ...................... 10-2003-0100703

(51) Int. Cl.
*G02F 1/1335* (2006.01)
*G02F 1/1333* (2006.01)
(52) U.S. Cl. ...................... 349/114; 349/106; 349/110; 349/113
(58) Field of Classification Search ................. 349/114
See application file for complete search history.

(56) References Cited

U.S. PATENT DOCUMENTS

| 6,614,496 | B1* | 9/2003 | Song et al. ................. 349/114 |
| 6,879,359 | B1* | 4/2005 | Kikkawa et al. ............ 349/113 |
| 2002/0089615 | A1* | 7/2002 | Sakamoto et al. ............ 349/43 |
| 2002/0171792 | A1* | 11/2002 | Kubota et al. .............. 349/114 |
| 2003/0007114 | A1* | 1/2003 | Kim et al. .................. 349/113 |
| 2004/0070711 | A1* | 4/2004 | Wen et al. .................. 349/114 |
| 2004/0080686 | A1* | 4/2004 | Chuang ....................... 349/113 |

* cited by examiner

*Primary Examiner*—Michael H. Caley
(74) *Attorney, Agent, or Firm*—Morgan, Lewis & Bockius LLP

(57) ABSTRACT

A substrate including: a thin film transistor including a gate electrode, an active layer, an ohmic contact layer, and a source/drain electrode; a reflector at a portion of a pixel region; a color filter layer on the thin film transistor at the pixel region; a black matrix layer between color filters of the color filter layer; a passivation layer on the color filter layer and the black matrix layer; and a pixel electrode on the passivation layer, the pixel region being partitioned into a transmission region and a reflection region, and the reflector being at the reflection region.

33 Claims, 4 Drawing Sheets

LIQUID CRYSTAL DISPLAY DEVICE AND METHOD FOR FABRICATING THE SAME

The present invention claims the benefit of Korean Patent Application No. 2003-100703 filed in Korea on Dec. 30, 2003, which is hereby incorporated by reference.

BACKGROUND OF THE INVENTION

1. Field of the Invention

The present invention relates to a liquid crystal display (LCD) device, and more particularly, to a dual screen liquid crystal display device having a color filter on TFT (COT) structure.

2. Description of the Related Art

Liquid crystal display (LCD) devices have advantages such as light weight, slim profile, and low power consumption, and are widely used for portable computers, office automation machines, and audio/video apparatuses. The LCD device includes two substrates and a liquid crystal layer interposed between the two substrates, and displays an image by manipulating transmission of light through the liquid crystal by displacing liquid crystal molecules using an electric field generated upon voltage application. Since the LCD device dose not generate light by itself, it uses ambient light or a backlight assembly as a light source.

Generally, LCD devices can be classified into two different categories: transmission type and reflection type, depending on how light is used. The transmission type LCD device is provided with a backlight assembly. When a voltage is applied to the transmission type LCD device, liquid crystal molecules are aligned to transmit or block light provided from the backlight assembly, thereby displaying an image. The reflection type LCD device is provided with a reflector. When a voltage is applied to the reflection type LCD device, liquid crystal molecules are aligned to transmit or block light, such as ambient light, that is incident from the exterior and then reflected by the reflector, thereby displaying an image.

A transflective type LCD device incorporating features of both the transmission type LCD device and the reflection type LCD device has been proposed. The transflective type LCD device uses the light provided by the backlight assembly or the ambient light. More particularly, the transflective LCD device uses the light provided by the backlight assembly in the transmission mode, and uses the ambient light in the reflection mode. In the transmission mode, an image is displayed using light provided by the backlight assembly disposed at a rear side of the LCD device that transmits straight through the liquid crystal panel. In the reflection mode, an image is displayed using light incident from a front side of the liquid crystal panel that is reflected by the reflector disposed at a rear side of the liquid crystal panel. Accordingly, the transflective LCD device always displays an image only at a front surface thereof.

Recently, a dual screen LCD device that can display an image at a front surface and at a rear surface has been investigated. Since the dual screen LCD device can be applied to a mobile phone, a waiting room television or the like, enormous ripple effect is anticipated. However, research and productization for a dual screen LCD device is not yet sufficient.

SUMMARY OF THE INVENTION

Accordingly, the present invention is directed to an LCD device and a method for fabricating the same that substantially obviate one or more problems due to limitations and disadvantages of the related art.

An object of the present invention is to provide an LCD device and a method for fabricating the same that can display an image on both surfaces of the liquid crystal panel using a liquid crystal panel having a COT structure.

Another object of the present invention is to provide an LCD device and a method for fabricating the same that can display an image on both surfaces of the liquid crystal panel using a transflective liquid crystal panel.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, there is provided a substrate including: a thin film transistor including a gate electrode, an active layer, an ohmic contact layer, and a source/drain electrode; a reflector at a portion of a pixel region, the pixel region being partitioned into a transmission region and a reflection region, and the reflector being at the reflection region; a color filter layer on the thin film transistor at the pixel region; a black matrix layer between color filters of the color filter layer; a passivation layer on the color filter layer and the black matrix layer; and a pixel electrode on the passivation layer.

In another aspect, an LCD device includes: a light unit providing light; a liquid crystal panel having a color filter on thin film transistor structure and a transflective structure, and controlling the light from the light unit by applying an voltage to display images at both surfaces of the liquid crystal panel; a first polarizer disposed on a first outer surface of the liquid crystal panel and having a transmission axis in a first direction; and a second polarizer disposed on a second outer surface of the liquid crystal panel and having a transmission axis in a second direction.

In another aspect, a method for fabricating a substrate includes: forming a gate electrode at a non-pixel region and a reflector at a portion of a pixel region; forming a gate insulating layer on the gate electrode and the reflector; forming an active layer, an ohmic contact layer, and a source/drain electrode to form a thin film transistor; forming a color filter layer at the pixel region; forming a black matrix layer at the non-pixel region; forming a first passivation layer on the color filter layer and the black matrix layer; and forming a pixel electrode on the first passivation layer.

In another aspect, a method for fabricating a liquid crystal display device includes: forming a gate electrode at a non-pixel region of a first substrate and a reflector in a portion of a pixel region of the first substrate; forming a gate insulating layer on the gate electrode and the reflector; forming an active layer, an ohmic contact layer, and a source/drain electrode to form a thin film transistor; forming a color filter layer on the pixel region; forming a black matrix layer at the non-pixel region; forming a first passivation layer on the color filter layer and the black matrix layer; forming a pixel electrode on the first passivation layer; forming a common electrode on a second substrate; and forming a liquid crystal layer between the first substrate and the second substrate.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention.

DETAILED DESCRIPTION OF THE PREFERRED EMBODIMENTS

Reference will now be made in detail to the preferred embodiments of the present invention, examples of which are illustrated in the accompanying drawings.

Figure 1:
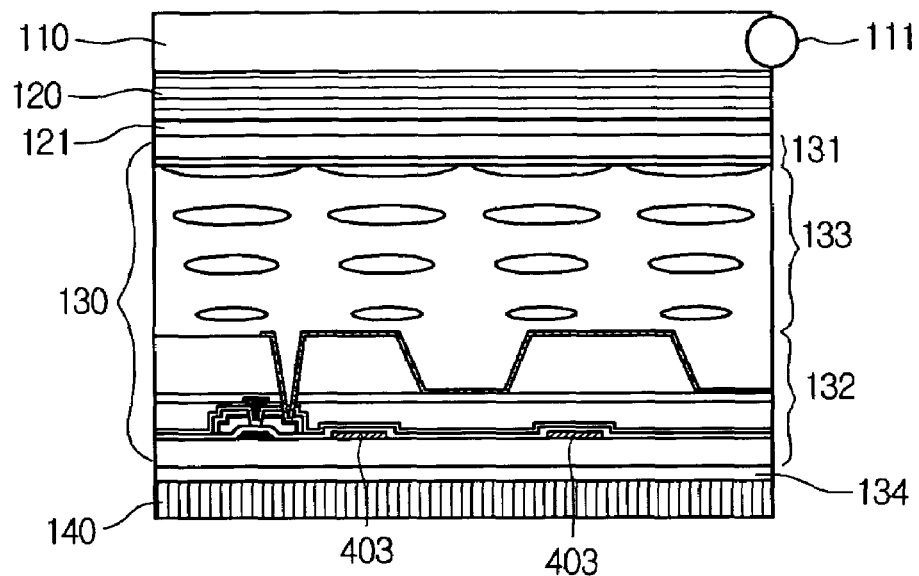
FIG. 1 is a cross-sectional view showing a structure of a dual screen type LCD device according to an embodiment of the present invention.

FIG. 1 is a cross-sectional view showing a structure of a dual screen type LCD device according to an embodiment of the present invention. As shown in FIG. 1, the dual screen type LCD device displays images at both front and rear surfaces of a single liquid crystal panel 130. The liquid crystal panel 130 includes a first substrate 131 having a common electrode (not shown) formed thereon, a second substrate 132 having a COT structure, and a liquid crystal material 133 interposed between the first substrate 131 and the second substrate 132.

The second substrate 132 has a TFT, a color filter layer, a black matrix layer, and a pixel electrode. In a typical LCD device, the black matrix layer and the color filter layer are formed on the first substrate 131. However, in the COT structure, the black matrix layer and the color filter layer are formed on the second substrate, and only the common electrode is formed on the first substrate 131.

The second substrate 132 has a transflective structure having a transmission region through which light transmits, and a reflection region at which light is reflected. At the reflection region, a reflector 403 is disposed. The reflector 403 is not disposed at the transmission region. Accordingly, light that is incident into the reflection region having the reflector 403 is reflected and light that is incident into the transmission region not having the reflector 403 is transmitted.

The dual screen type LCD device may further include a retardation film 121 and 134 on an outer surface of at least one of the first and second substrates 131 and 132. The retardation films 121 and 134 compensate a viewing angle between a direction perpendicular to the first substrate 131 or the second substrate 132 and a direction where the viewing angle is changed, to thereby extend a region where a gray inversion does not occur and increase a contrast ratio in a diagonal direction. The retardation films 121 and 134 can be made of a negative uniaxial film having one optical axis or a negative biaxial film having two optical axes. The negative biaxial film may be preferred for a wider viewing angle.

The dual screen type LCD device may further include first and second polarizers 120 and 140 on outer surfaces of the first and second substrates 131 and 132. The first polarizer 120 and the second polarizer 140 are arranged such that their light transmission axes are perpendicular to each other. In other words, the first polarizer 120 transmits only the light polarized linearly in a first direction, such as the y-axis direction, from the incident light, whereas the second polarizer 140 transmits only the light polarized linearly in a second direction, such as the x-axis direction, from the incident light.

The dual screen type LCD device is further provided with a front light unit 110 which is disposed on an outer surface of the first polarizer 120 to generate light and provide the generated light to the liquid crystal panel 130. The front light unit 110 includes a light source 111 disposed at a side edge, for generating a linear light, a light guiding plate for converting the linear light generated by the light source 111 into a surface light and providing the liquid crystal panel 130 with the converted surface light, and a diffuser disposed at a front side of the light guiding plate for diffusing the surface light. Also, the front light unit 110 may be further provided with a prism pattern which is disposed at a rear side of the light guiding plate to change a light path in a vertical direction. In the dual screen type LCD device, an image display surface is determined depending on an applied voltage.

Figure 2:
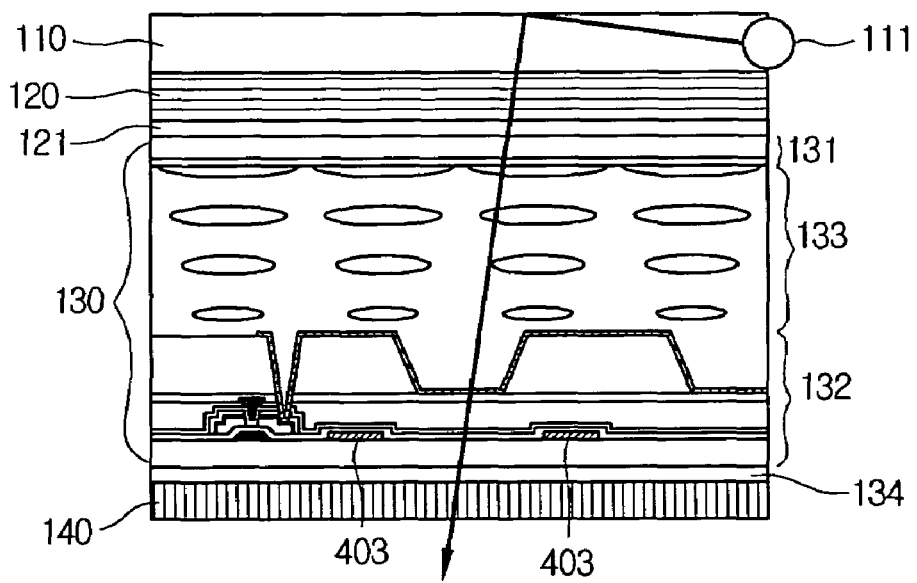
FIG. 2 is a cross-sectional view illustrating an image displayed when no voltage is applied in a dual screen type LCD device according to an embodiment of the present invention.

FIG. 2 is a cross-sectional view illustrating an image displaying when no voltage is applied in a dual screen type LCD device according to an embodiment of the present invention. As shown in FIG. 2, when no voltage is applied to the liquid crystal panel 130, the dual screen type LCD device operates in a transmission mode such that an image is displayed at a rear surface of the liquid crystal panel 130. In other words, when no voltage is applied to the liquid crystal panel 130, a light polarized linearly in a first direction from the light generated by the front light unit 110 or ambient light is passed, and then is phase-shifted by 90 degrees while passing through the liquid crystal panel 130. The linearly polarized light, which is phase-shifted by 90 degrees passes through the second polarizer 140. As described above, the second polarizer 140 transmits only the light polarized linearly in the second direction perpendicular to the first direction of the first polarizer 120. Since the linearly polarized light, which is phase-shifted by 90 degrees has the second direction, it transmits through the second polarizer 140. Thus, all light transmits through to the rear surface of the liquid crystal panel 130 so that the rear surface of the liquid crystal panel 130 becomes a 'white' state, whereas all light does not transmit through to the front surface of the liquid crystal panel 130 so that the front surface of the liquid crystal panel 130 becomes a 'black' state. That is, when no voltage is applied to the liquid crystal panel 130, an image is displayed at the rear surface of the liquid crystal panel 130.

Figure 3:
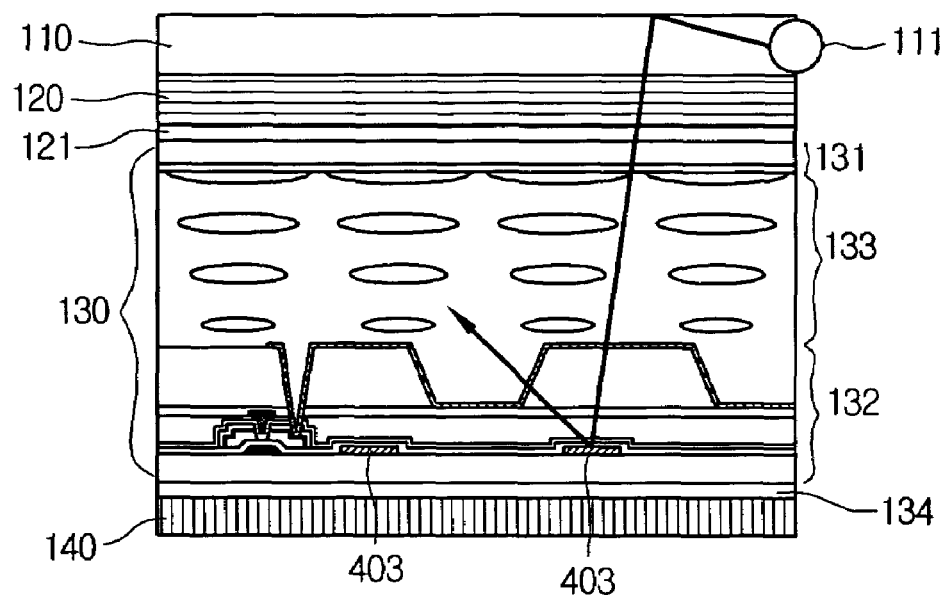
FIG. 3 is a cross-sectional view illustrating an image displayed when a voltage is applied in a dual screen type LCD device according to an embodiment of the present invention.

FIG. 3 is a cross-sectional view illustrating an image displayed when a voltage is applied in a dual screen type LCD device according to an embodiment of the present invention. As shown in FIG. 3, when a voltage is applied to the liquid crystal panel 130, the dual screen type LCD device operates in a reflection mode such that an image is displayed at a front surface of the liquid crystal panel 130. In other words, when a voltage is applied to the liquid crystal panel 130, the light polarized linearly in a first direction by the first polarizer 120 from the light generated by the front light unit 110 or ambient light is passed, and then is phase-shifted by 90 degrees while passing through the liquid crystal panel 130. The linearly polarized light, which is phase-shifted by 90 degrees, is reflected by a reflector 403 because when no voltage is applied, the liquid crystal panel 130 operates in the reflection mode. At this time, the linearly polarized and reflected light is phase-shifted back to its original phase, while again passing through the liquid crystal panel 130.

The linearly polarized light having the restored original phase passes through the first polarizer 120. Accordingly, all light transmits through the front surface of the liquid crystal panel 130 so that the front surface of the liquid crystal panel 130 becomes a 'white' state, whereas all light does not transmit through the rear surface of the liquid crystal panel 130 so that the rear surface of the liquid crystal panel 130 becomes a 'black' state. That is, when a voltage is applied to the liquid crystal panel 130, an image is displayed at the front surface of the liquid crystal panel 130. Thus, depending on whether a voltage is applied or not, the liquid crystal panel 130 can operate in the transmission mode or the reflection mode such that an image is displayed at either the front surface or the rear surface of the liquid crystal panel 130.

Figure 4:
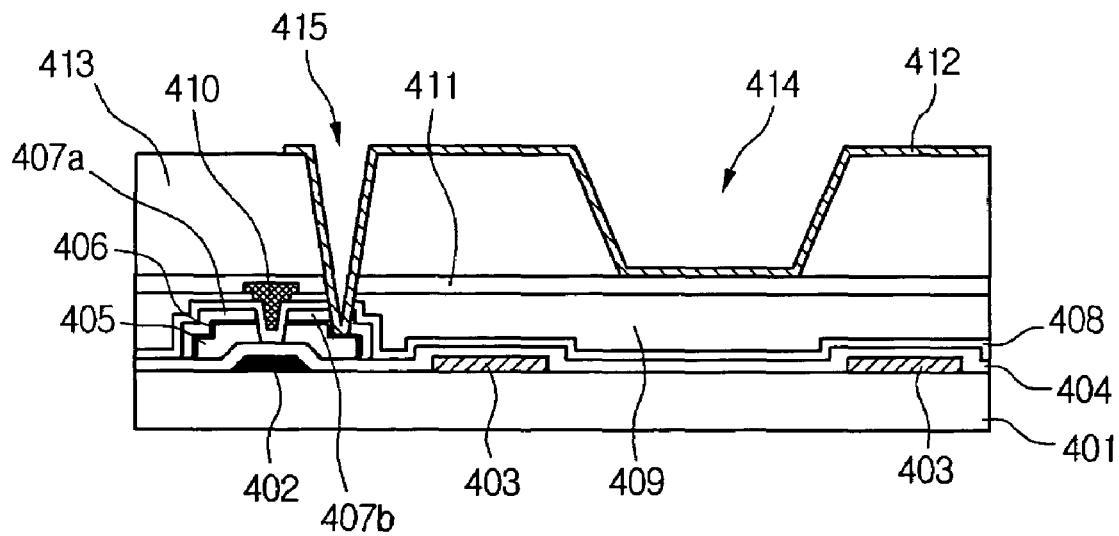
FIG. 4 is a detailed view of a second substrate in the dual screen type LCD device of FIG. 1.

FIG. 4 is a detailed view of the second substrate of the dual screen type LCD device of FIG. 1. As shown in FIG. 4, the second substrate 132 has a COT structure and a transflective structure. The second substrate 132 includes a gate line (not shown) and a gate electrode 402 formed using a gate metal film on a transparent insulating substrate 401. A reflector 403 formed of a reflective material is in a portion of each pixel region on the insulating substrate 401. A gate insulating layer 404 is formed on the insulating substrate 401 having the gate electrode 402 and the reflector 403. An active layer 405, an ohmic contact layer 406, source/drain electrodes 407a and 407b and a data line (not shown) are sequentially formed on the gate insulating layer 404. A first passivation layer 408 is formed over the gate insulating layer 404 for a device protection. A color filter layer 409 is formed in each pixel region on the first passivation layer 408. A black matrix layer 410 is formed between the pixel regions. An overcoat layer 411 is formed on the color filter layer 409 and the black matrix layer 410. A second passivation layer 413 is formed on the overcoat layer 411. A pixel electrode 412 formed on the second passivation layer 413.

The reflector 403 can also be formed on the same layer as the gate electrode 402 or on a different separate layer. In the case where the reflector 403 is formed on the same layer as the gate electrode 402, the gate electrode 402 is first formed on the insulating substrate 401 and then, the reflective material is deposited and etched to form the reflector 403 in portions of the pixel region on the insulating substrate 401. Accordingly, the pixel region can be partitioned as a reflection region and a transmission region. That is, a region at which the reflector 403 is formed is the reflection region, and a region at which the reflector 403 is not formed is the transmission region. Thus, the second substrate 132 has a transflective structure. The reflector 403 can be made of one selected from the group including Ag, Al and AlNd-based alloy.

A thin film transistor (TFT) includes a gate electrode 402, an active layer 405, an ohmic contact layer 406 and source/drain electrodes 407a and 407b. Since the color filter layer 409 is formed on the TFT, the second substrate 132 has a COT structure.

The second passivation layer 413 includes a contact hole 415 for connecting the pixel electrode 412 with the drain electrode 407b, and a transmission hole 414 for effectively transmitting the light. The transmission hole 414 corresponds to the transmission region.

FIGS. 5A through 5D are cross-sectional views illustrating a method for fabricating a second substrate having a COT structure in a dual screen type LCD device according to an embodiment of the present invention.

Figure 5A:
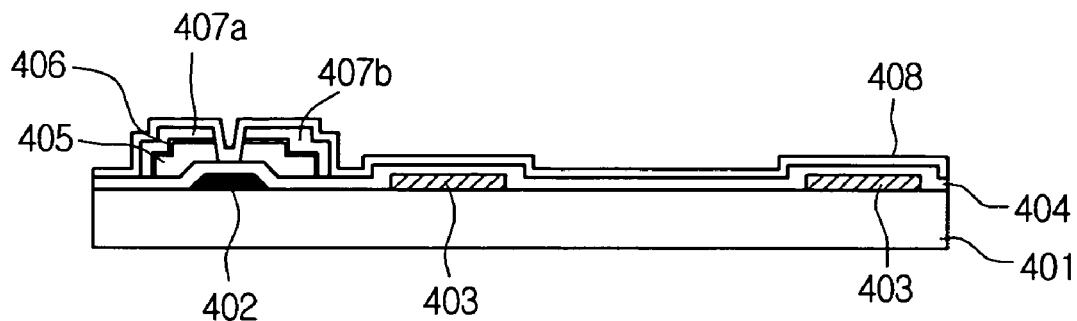
FIGS. 5A through 5D are cross-sectional views illustrating a process for fabricating a second substrate having a COT structure in a dual screen type LCD device according to an embodiment of the present invention.

As shown in FIG. 5A, a gate metal film is deposited on the insulating substrate 401 and then etched to form the gate line (not shown) and the gate electrode 402. Subsequently, a reflective material is deposited and then etched to form the reflector 403. The reflector 403 can be formed at least two portions of each pixel region. The reflector 403 can be made of one selected from the group including of Ag, Al and AlNd-based alloy. When the liquid crystal panel operates in the reflection mode, that is, when a voltage is applied to the liquid crystal panel, the reflector 403 reflects the light which is generated from the front light unit 110, or ambient light, thereby displaying an image at a front surface of the liquid crystal panel 130.

The gate insulating layer 404 is deposited on the insulating substrate 401 having the gate electrode 402 and the reflector 403 using plasma enhanced chemical vapor deposition (PECVD). Intrinsic amorphous silicon and doped amorphous silicon are deposited and then etched to form the active layer 405 and the ohmic contact layer 406. A metal film is deposited on the ohmic contact layer 406 and then etched to form the source/drain electrodes 407a and 407b and the data line (not shown). Accordingly, a TFT including the gate electrode 402, the active layer 405, the ohmic contact layer 406 and the source/drain electrodes 407a and 407b is formed. An inorganic insulating film is deposited on the insulating substrate 401 having the TFT to form the first passivation layer 408. The first passivation layer 408 can be formed for device protection with a thin thickness such that the transmission of the light is not hindered.

Figure 5B:
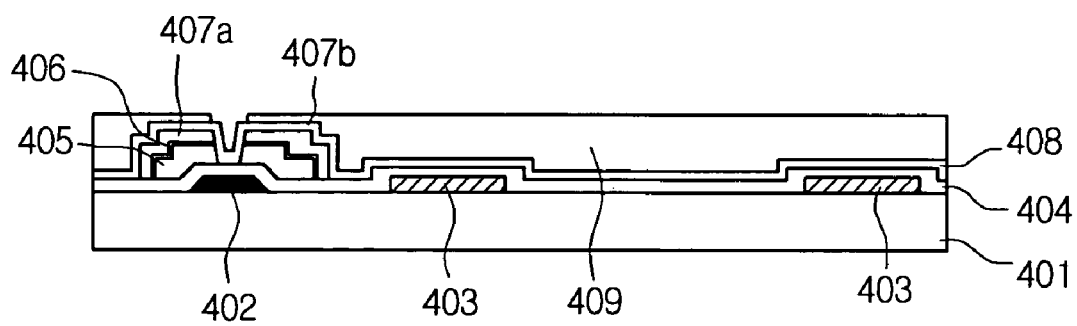

As shown in FIG. 5B, a red (R) color resist, a green (G) color resist and a blue (B) color resist are used to form the color filter layer 409 at each pixel region on the first passivation layer 408. The color filter layer 409 can be formed using a dye method, an electrodeposition method, a pigment dispersion method or a print method. The color filter layer 409 is not formed between the pixel regions. More specifically, the color filter layer 409 is not formed between the gate line, the data line and the source electrode 407a, and the drain electrode 407b. Since the color filter layer 409 is formed on the TFT, the resulting structure is a COT structure.

Figure 5C:
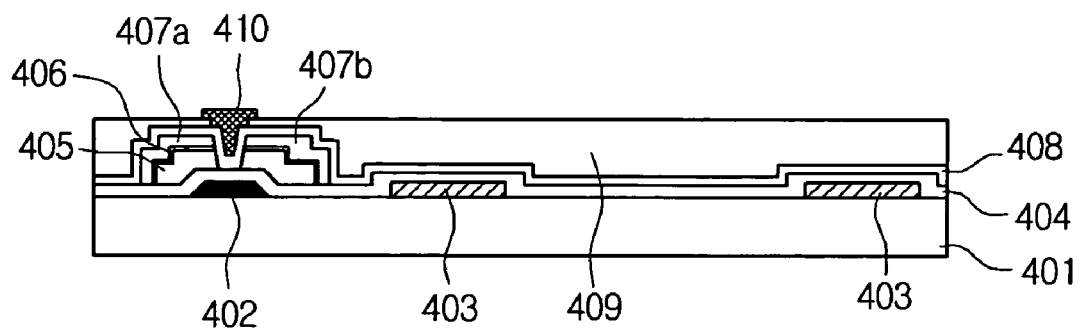

As shown in FIG. 5C, a black resin is coated on the insulating substrate 401 having the color filter layer 409 and then etched to form the black matrix layer 410 between the pixel regions. The black matrix layer 410 is formed to be wider than a gap between the pixel regions. Thus, the edge of the color filter layer 409 is covered to prevent a white spot from being generated at the edge of the color filter layer 409.

Figure 5D:
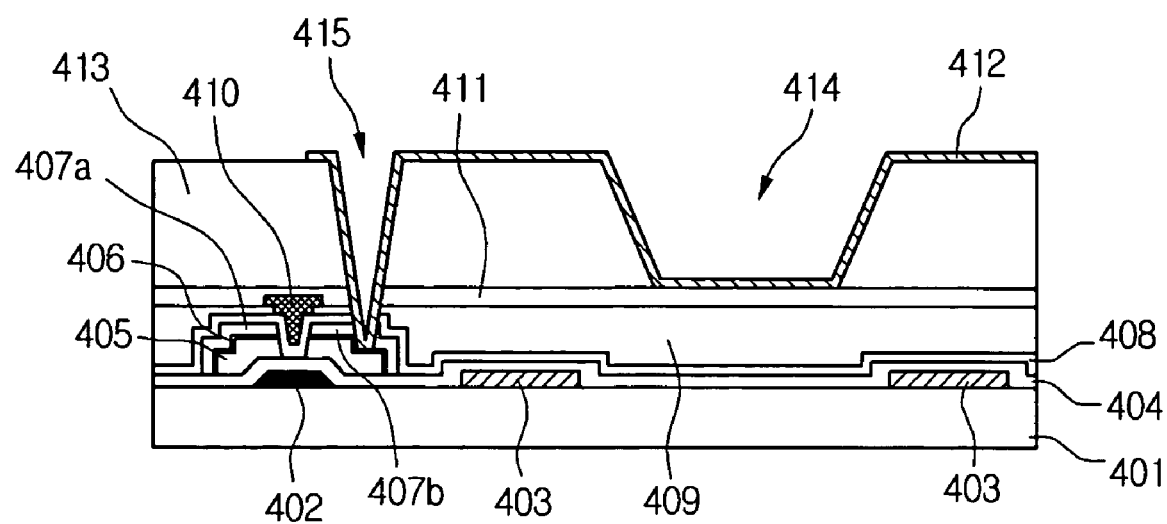

As shown in FIG. 5D, the overcoat layer 411 is formed on the color filter layer 409 and the black matrix layer 410. The overcoat layer 411 can be formed of an organic material or an inorganic material. When the overcoat layer 411 is formed of an organic material, excellent planarization properties can be obtained. The organic material may include BenzoCycloButene (BCB), an acrylic resin and the like. The overcoat layer 411 can be formed with a thin thickness such that the transmission of the light is not hindered.

The second passivation layer 413 is formed using the organic insulating film on the overcoat layer 411. The second passivation layer 413 also includes a transmission hole 414 exposing the overcoat layer 411 for effectively transmitting light, and a drain contact hole 415 for exposing the drain electrode 407b. The transmission hole 414 is formed to correspond to the transmission region of the pixel region. Incident light rapidly transmits through the transmission region due to the absence of the second passivation layer 413, which improves light efficiency.

A transparent metallic material, such as indium tin oxide (ITO) or indium zinc oxide (IZO), is deposited on the second passivation layer 413 and then etched to form the pixel electrode 412. The pixel electrode 412 is connected to the drain electrode 407b through the drain contact hole 415. Through the above procedures, the second substrate 132 is manufactured.

A first substrate 131 corresponding to the second substrate 132 is manufactured having a common electrode formed on another transparent insulating substrate. The first substrate 131 and the second substrate 132 are attached so as to be spaced apart by a predetermined distance from each other. Liquid crystal is injected between the first and second substrates 131 and 132 to provide the liquid crystal panel 130.

A sealant (not shown) can be printed on a connection wiring part disposed at the edge of the liquid crystal panel 130. The sealant can be formed with a thickness corresponding to the cell gap of the liquid crystal panel 130. The dual screen type LCD device may further include a retardation film. The retardation film is made to have an anisotropic distribution, which is opposite to a liquid crystal molecule in as much as possible, thereby eliminating a light retardation difference depending on viewing angle. A uniaxial refractive-index anisotropic substance or a biaxial refractive-index anisotropic substance is used as the retardation film.

Since the above-constructed dual screen type LCD device can be used as a dual screen display device, it can be used in a mobile terminal or in a waiting room television. The dual screen type LCD device can display information in a variety of ways. For example, in the case where a folder is opened and closed in a folder-type mobile terminal, the image can be displayed differently depending on whether opened or closed. In a sliding-type mobile terminal, the image can be displayed in a different direction depending on a sliding degree. As described above, the present invention can display an image at both the front and rear of a liquid crystal panel having both the COT structure and the transflective structure.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A substrate comprising:
    a thin film transistor including a gate electrode formed in a gate electrode layer, an active layer, an ohmic contact layer, and a source/drain electrode;
    a reflector formed in the gate electrode layer at a portion of a pixel region, the pixel region being partitioned into a transmission region and a reflection region, and the reflector being at the reflection region;
    a color filter layer on the thin film transistor at the pixel region;
    a black matrix layer between color filters of the color filter layer, the black matrix layer being formed to cover an edge region of each of the color filters;
    a passivation layer on the color filter layer and the black matrix layer; and
    a pixel electrode on the passivation layer.

2. The substrate according to claim 1, further comprising an overcoat layer on the black matrix layer and the color filter layer.

3. The substrate according to claim 1, wherein the reflector is formed on the same layer as the gate electrode.

4. The substrate according to claim 1, wherein the reflector is formed of one of Ag, Al and AlNd-based alloy.

5. The substrate according to claim 1, wherein the passivation layer has a transmission hole corresponding to the transmission region.

6. The substrate according to claim 1, further including a gate insulating layer, the reflector being formed directly on the substrate and directly beneath the gate insulating layer.

7. A light crystal display device comprising:
    a light unit providing light;
    a liquid crystal panel having a color filter on a thin film transistor structure and a transflective structure, the thin film transistor structure including a gate electrode formed in a gate electrode layer and the transflective structure including a reflector formed in the gate electrode layer, the light from the light unit being controlled by applying a voltage to display images at both surfaces of the liquid crystal panel;
    a first polarizer disposed on a first outer surface of the liquid crystal panel and having transmission axis in a first direction; and
    a second polarizer disposed on a second outer surface of the liquid crystal panel and having a transmission axis in a second direction.

8. The device according to claim 7, further comprising a retardation film on an outer surface of any one of the first polarizer and the second polarizer.

9. The device according to claim 7, wherein the liquid crystal panel has a reflection mode that an image is displayed at a first surface of the liquid crystal panel, and a transmission mode that an image is displayed at a second surface of the liquid crystal panel.

10. The device according to claim 9, wherein the voltage is not applied when the liquid crystal panel is in the transmission mode.

11. The device according to claim 9, wherein the voltage is applied when the liquid crystal panel is in the reflection mode.

12. The device according to claim 7, wherein the liquid crystal panel controls ambient light according to the applied voltage to display images at both surfaces.

13. The device according to claim 7, wherein the liquid crystal panel includes,
    a first substrate;
    a second substrate having the color filter on thin film transistor structure and the transflective structure; and
    a liquid crystal layer interposed between the first substrate and the second substrate.

14. The device according to claim 13, further comprising a common electrode on the first substrate.

15. The device according to claim 13, wherein the second substrate includes, a thin film transistor including the gate electrode, an active layer, an ohmic contact layer, and a source/drain electrode;

the reflector being formed at a portion of a pixel region, the pixel region being partitioned into a transmission region and a reflection region, and the reflector being on the reflection region;

a color filter layer on the thin film transistor at the pixel region;

a black matrix layer between color filters of the color filter layer;

a passivation layer on the color filter layer and the black matrix layer; and a pixel electrode on the passivation layer.

16. The device according to claim 15, wherein the reflector reflects the light when the liquid crystal panel is in the reflection mode such that an image is displayed at the first surface.

17. The device according to claim 7, wherein the liquid crystal panel further a substrate, and a gate insulating layer, and the reflector is formed directly on the substrate and directly beneath the gate insulating layer.

18. A method for fabricating a substrate, the method comprising:

forming a gate electrode in a gate electrode layer at a non-pixel region and a reflector in the gate electrode layer at a portion of a pixel region;

forming a gate insulating layer on the gate electrode and the reflector;

forming an active layer, an ohmic contact layer, and a source/drain electrode to form a thin film transistor;

forming a color filter layer at the pixel region;

forming a black matrix layer at the non-pixel region, the black matrix layer being formed to cover an edge region of each of color filters of the color filter layer;

forming a first passivation layer on the color filter layer and the black matrix layer; and forming a pixel electrode on the first passivation layer.

19. The method according to clam 18, further comprising forming a second passivation layer on the gate insulating layer and the thin film transistor.

20. The method according to clam 18, further comprising forming an overcoat layer over the thin film transistor and the color filter layer.

21. The method according to claim 18, wherein the reflector is formed of one of Ag, Al and AlNd-based alloy.

22. The method according to claim 18, wherein the reflector is formed on the same layer as the gate electrode.

23. The method according to claim 18, wherein a transmission hole is formed in the first passivation layer corresponding to the pixel region.

24. The method according to claim 18, wherein the reflector is formed directly on the substrate, and the gate insulating layer is formed directly on the reflector.

25. A method for fabricating a liquid crystal display device, the method comprising:

forming a gate electrode in a gate electrode layer at a non-pixel region of a first substrate and a reflector in the gate electrode layer in a portion of a pixel region of the first substrate;

forming a gate insulating layer on the gate electrode and the reflector; forming an active layer, an ohmic contact layer, and a source/drain electrode to form a thin film transistor;

forming a color filter layer on the pixel region;

forming a black matrix layer at the non-pixel region, the black matrix layer being formed to cover an edge region of each of color filters of the color filter layer;

forming a first passivation layer on the color filter layer and the black matrix layer;

forming a pixel electrode on the first passivation layer;

forming a common electrode on a second substrate; and forming a liquid crystal layer between the first substrate and the second substrate.

26. The method according to claim 25, further comprising forming a first polarizer and a second polarizer on outer surfaces of the first and second substrates.

27. The method according to claim 25, further comprising forming a retardation film on an outer surface of at least one of the first and second substrates.

28. The method according to claim 25, further comprising forming a second passivaion layer on the gate insulating layer and the thin film transistor.

29. The method according to claim 25, further comprising forming an overcoat layer over the thin film transistor and the color filter layer.

30. The method according to claim 25, wherein the reflector is formed of one of Ag, Al and AlNd-based alloy.

31. The method according to claim 25, wherein the reflector is formed on the same layer as the gate electrode.

32. The method according to claim 25, wherein a transmission hole is formed in the first passivation layer corresponding to the pixel region.

33. The method according to claim 25, wherein the reflector is formed directly on the first substrate, and the gate insulating layer is formed directly on the reflector.

* * * * *